United States Patent
Arbab et al.

(10) Patent No.: US 9,533,913 B2
(45) Date of Patent: Jan. 3, 2017

(54) METHODS OF MAKING COLORED GLASS BY SURFACE MODIFICATION

(75) Inventors: Mehran Arbab, Pittsburgh, PA (US); Songwei Lu, Wexford, PA (US)

(73) Assignee: Vitro, S.A.B. de C.V., Neuvo Leon (MX)

( * ) Notice: Subject to any disclaimer, the term of this patent is extended or adjusted under 35 U.S.C. 154(b) by 863 days.

(21) Appl. No.: 12/649,518

(22) Filed: Dec. 30, 2009

(65) Prior Publication Data

US 2011/0154860 A1  Jun. 30, 2011

Related U.S. Application Data

(63) Continuation-in-part of application No. 12/413,994, filed on Mar. 30, 2009, now Pat. No. 7,851,016, which is a continuation of application No. 11/843,756, filed on Aug. 23, 2007, now abandoned, which is a continuation of application No. 10/623,401, filed on Jul. 18, 2003, now abandoned, application No. 12/649,518, which is a continuation-in-part of application No. 11/543,644, filed on Oct. 5, 2006, now Pat. No. 8,679,580, which is a continuation-in-part of application No. 10/897,847, filed on Jul. 22, 2004, now abandoned.

(60) Provisional application No. 60/397,486, filed on Jul. 19, 2002.

(51) Int. Cl.
| | |
|---|---|
| *C03C 17/09* | (2006.01) |
| *C03C 17/245* | (2006.01) |
| *C03C 21/00* | (2006.01) |

(52) U.S. Cl.
CPC .............. *C03C 17/09* (2013.01); *C03C 17/245* (2013.01); *C03C 21/007* (2013.01); *C03C 2217/217* (2013.01); *C03C 2217/25* (2013.01); *C03C 2217/261* (2013.01); *C03C 2218/15* (2013.01)

(58) Field of Classification Search
USPC ......................................... 65/60.1–60.7, 99.2
See application file for complete search history.

(56) References Cited

U.S. PATENT DOCUMENTS

| | | | | |
|---|---|---|---|---|
| 3,467,508 | A | * | 9/1969 | Loukes et al. .................. 65/30.1 |
| 3,656,926 | A | * | 4/1972 | Loukes et al. .................. 65/60.5 |
| 3,775,154 | A | * | 11/1973 | Grego et al. ................. 427/372.2 |
| 3,887,348 | A | * | 6/1975 | Plumat et al. ................... 501/70 |
| 4,170,460 | A | * | 10/1979 | Donley ......................... 65/30.13 |
| 5,071,796 | A | | 12/1991 | Jones et al. |
| 5,352,640 | A | | 10/1994 | Combes et al. |
| 5,545,596 | A | | 8/1996 | Casariego et al. |
| 5,688,727 | A | | 11/1997 | Shelestak et al. |
| 5,780,372 | A | | 7/1998 | Higby |
| 5,807,417 | A | | 9/1998 | Boulos et al. |
| 5,837,629 | A | | 11/1998 | Combes et al. |
| 6,482,374 | B1 | | 11/2002 | Kumar et al. |
| 6,562,417 | B2 | | 5/2003 | Suzuki et al. |

FOREIGN PATENT DOCUMENTS

WO  WO 0128941 A1 *  4/2001

* cited by examiner

*Primary Examiner* — Angela Ortiz
*Assistant Examiner* — Cynthia Szewczyk
(74) *Attorney, Agent, or Firm* — Andrew C. Siminerio (57) ABSTRACT

A method of making colored glass in a float glass process includes the steps of: melting glass batch materials in a furnace to form a glass melt; transporting the glass melt into a float glass chamber having a flame spray device, the glass melt forming a float glass ribbon; supplying at least one coating material to the flame spray device to form a spray having coating particles; and directing the spray onto the float glass ribbon to diffuse the particles into the surface of the float glass ribbon to form a glass sheet of a desired color.

7 Claims, 6 Drawing Sheets

METHODS OF MAKING COLORED GLASS BY SURFACE MODIFICATION

CROSS-REFERENCE TO RELATED APPLICATION

This application is a continuation-in-part of U.S. application Ser. No. 12/413,994, filed Mar. 30, 2009, (now U.S. Pat. No. 7,851,016, issued Dec. 14, 2010), which is a continuation of U.S. application Ser. No. 11/843,756, (now abandoned) filed Aug. 23, 2007, which is a continuation of U.S. application Ser. No. 10/623,401 (now abandoned), filed Jul. 18, 2003, which claimed priority to U.S. Application Ser. No. 60/397,486, filed Jul. 19, 2002. This application is also a continuation-in-part of U.S. application Ser. No. 11/543,644 (now abandoned), filed Oct. 5, 2006, which was a continuation-in-part of U.S. application Ser. No. 10/897,847 (now abandoned), filed Jul. 22, 2004.

BACKGROUND OF THE INVENTION

Field of the Invention

This invention relates generally to tinted or colored glass and, in one particular embodiment, to a method of making colored glass in a float glass process.

Technical Considerations

In a typical float glass process, glass batch materials are melted in a glass furnace to produce a glass melt. The glass melt is poured onto a bath of molten metal, typically tin, in a float bath. The glass melt is drawn across the top of the molten tin to form a dimensionally stable float glass ribbon.

To form a colored glass sheet, one or more colorant materials are added to the glass batch materials. For example, the primary colorant in green colored glass compositions is iron, which can be present in ferric ($Fe_2O_3$) and ferrous (FeO) forms. Other common colorants include transition or rare earth metal oxides such as cobalt, nickel, chromium, manganese, and titanium, erbium, neodymium, and selenium in its elemental or ionized states, depending on the desired color of the glass sheet. These colorants are added to the glass batch material and become homogeneously dissolved throughout the resultant piece of glass.

In producing conventional colored glass, the relative amounts of these colorants is closely monitored and controlled within an operating range to provide the glass with the desired color and spectral properties for a particular use. Varying the colorants outside of this operating range or inadequately melting these colorants in the glass melt can detrimentally effect the final color and light transmittance characteristics of the glass as well as the melting qualities of the glass composition. Additionally, some blue or green colored glass compositions contain selenium as one of the major colorants. However, a problem with selenium is that it is highly volatile at the temperature is used for conventional glass manufacture. The selenium can rapidly volatilize before it can be incorporated into the glass and can thus affect the final glass color. Selenium volatilization can also lead to other production problems, such as, unacceptable furnace emissions, color streaks, and poor color control.

If more than one color of glass is in production, a separate furnace is required for each glass melt composition. This increases the capital investment required and makes color changes difficult. Alternatively, in the same furnace, it takes days or more than a week to change glass color from one to another, during which process hundreds of tons of out-of-color specification glass might be discarded or recycled. This glass color change process can be particularly long if it involves changing from an intensely colored product to a lightly colored product.

Therefore, it would be advantageous to provide a method of making colored float glass that eliminates or reduces at least some of the problems described above.

SUMMARY OF THE INVENTION

A method of making colored glass in a float glass process comprises melting glass batch materials in a furnace to form a glass melt and transporting the glass melt into a float glass chamber having a flame spray device. The glass melt forms a float glass ribbon in the float chamber. At least one coloring material is supplied to the flame spray device to form a spray having coloring particles. The spray is directed onto the float glass ribbon to diffuse the coating particles into the surface of the float glass ribbon to form a glass sheet of a desired color.

A particular method of making colored glass in a float glass process comprises melting glass batch materials in a furnace to form a glass melt and transporting the glass melt into a float glass chamber having a flame spray device. The glass melt forms a float glass ribbon in the float chamber. Two or more coloring materials are supplied to the flame spray device to form a spray having coloring particles. The spray is directed onto the float glass ribbon to diffuse the coating particles into the surface of the float glass ribbon to form a glass sheet of a desired color.

DESCRIPTION OF THE PREFERRED EMBODIMENTS

As used herein, spatial or directional terms, such as "left", "right", "inner", "outer", "above", "below", and the like, relate to the invention as it is shown in the drawing figures. However, it is to be understood that the invention can assume various alternative orientations and, accordingly, such terms are not to be considered as limiting. Further, as used herein, all numbers expressing dimensions, physical characteristics, processing parameters, quantities of ingredients, reaction conditions, and the like, used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 1 to 3.3, 4.7 to 7.5, 5.5 to 10, and the like. Additionally, all documents, such as, but not limited to, issued patents and patent applications, referred to herein are to be considered to be "incorporated by reference" in their entirety. In the following discussion, the refractive index values are those for a reference wavelength of 550 nanometers (nm). Any reference to amounts, unless otherwise specified, is "by weight percent". The total iron content of the glass compositions disclosed herein is expressed in terms of $Fe_2O_3$ in accordance with standard analytical practice, regardless of the form actually present. Likewise, the amount of iron in the ferrous state is reported as FeO, even though it may not actually be present in the glass as FeO. The term "total iron" means total iron expressed in terms of $Fe_2O_3$ and the term "FeO" means iron in the ferrous state expressed in terms of FeO. The term "redox ratio" means the amount of iron in the ferrous state (expressed as FeO) divided by the amount of total iron (expressed as $Fe_2O_3$). Selenium is expressed in terms of elemental Se and cobalt is expressed in terms of CoO. Chromium and titanium are expressed as $Cr_2O_3$ and $TiO_2$, respectively. As used herein, the terms "solar control" and "solar control properties" mean characteristics or properties which affect the solar properties of the glass, such as visible, infrared (IR) and/or ultraviolet (UV) transmittance and/or reflectance of the glass. As used herein, the term "essentially free of Se" means less than or equal to 3 ppm, such as less than or equal to 2 ppm, such as less than or equal to 1 ppm, such as less than or equal to 0.5 ppm, such as less than or equal to 0.1 ppm, such as no intentional addition of Se to the glass composition.

Float glass compositions typically have a base portion and major colorants. By "base portion" is meant the major constituents of the glass without the major colorants. By "major colorants" is meant materials intentionally added to provide the glass with a color in a desired dominant wavelength range. Although the invention can be practiced with any type of conventional glass, the general principles of the invention will be described with respect to a conventional soda-lime-silica glass composition. An exemplary soda-lime-silica type glass has a base portion characterized as follows (all values are in weight percent):

| | |
|---|---|
| $SiO_2$ | 65 to 75 |
| $B_2O_3$ | 0 to 5 |
| $Na_2O$ | 10 to 20 |
| CaO | 5 to 15 |
| MgO | 0 to 5 |
| $Al_2O_3$ | 0 to 5 |
| $K_2O$ | 0 to 5 |

$SiO_2$ is the principle component for the glass. $Na_2O$ and $K_2O$ impact the melting characteristics of the glass. MgO and CaO impact glass durability and affect the divitrification temperature and viscosity of the glass during molding. $Al_2O_3$ also influences glass durability.

It is also known to add iron to the glass batch materials. For example, in one non-limiting embodiment, the total iron ($Fe_2O_3$) is present in an amount of 0.7 wt. % to 0.9 wt. %, such as 0.7 wt. % to 0.85 wt. %, such as 0.73 wt. % to 0.81 wt. %. The iron, typically in the form of iron oxides, provides the glass with one or more functions. For example, ferric oxide is a strong ultraviolet radiation absorber and operates as a yellow colorant in the glass. Ferrous oxide is a strong infrared radiation absorber and operates as a blue colorant. The amount of ferrous oxide and ferric oxide (with or without the presence of other major colorants) can be adjusted to provide the glass with a desired color. The redox ratio of the glass can be, for example, in the range of 0.2 to 0.4, such as 0.25 to 0.35.

In a typical float glass process, selected colorants would be added to this basic composition to become mixed in with the other components and affect the final color of the glass. However, in the practice of the invention, rather than adding major colorants to the glass batch materials, the glass is provided with a desired color while the float ribbon is in the float chamber, as described below.

In the practice of the invention, the glass batch materials are melted in the furnace to form a glass melt. The glass melt can be clear glass or can have a first color. For example, for iron containing glass, the glass may have a slight greenish tint. The glass melt is poured into the float chamber and onto the molten metal. However, once in the float chamber, the glass is imparted with a different color than that of the glass melt. This is accomplished by providing a flame spray device in the float chamber above the glass ribbon. A suitable flame spray device is commercially available from Beneq Oy of Vantaa, Finland. A flame spray device is also described in WO 01/28941. In a flame spray device, coating materials are atomized to form a spray having coloring agents, such as coating particles. In the practice of the invention, this spray is then directed on to the hot float glass ribbon and the particles become defused into the surface or the upper portion of the float glass ribbon to impart the glass sheet with a desired color. The coating particles can be metal oxide nanoparticles. The coloring agents defuse into the glass and react with the glass matrix producing a characteristic color. This color can be changed simply by changing the coloring agents supplied to the flame spray device. Thus, no separate color glass furnaces or lengthy color change period are required and material consumption is therefore optimized. Also, rather than being homogeneously mixed throughout the glass, the coloring agents in the invention are only present at or near the top surface of the glass sheet. This reduces the overall amount of coloring agent required to make glass sheets of a desired color.

This process can be practiced anywhere in the float chamber but it is believed to be more practical at locations where the temperature of the float glass ribbon is in the range of 400° C. to 1,000° C., such as 500° C. to 900° C., such as 500° C. to 800° C., such as 600° C. to 800° C., such as 700° C. to 800° C.

It has been found that using a conventional flame spray device in a float chamber can provide resultant glass sheets of varying color dependent upon the coating material supplied to the flame spray device. For example, iron (e.g., iron oxides) provides a red or pink color to the glass sheet. Cobalt (e.g., in the form of CoO) provides a blue color. Silver provides a yellow color. A mixture of iron (e.g., iron oxides) and manganese (e.g., MnO) provides a gray color. The perceived color and/or the darkness of the glass will increase by increasing the density of the nanoparticles into the glass surface. As an additional benefit of the invention, since iron oxide nanoparticles incorporated into the glass surface produce a red or purple-pink color, this colorant (alone or in combination with other colorants) can be used as a replacement for selenium in the glass melt to alleviate the problems with using selenium described above.

Exemplary aspects of the invention will now be described. However, it is to be understood that the invention is not limited to these specific examples.

Example 1

In this example, a 0.2364 inch thick piece of Solex® Glass (standard) was compared to the same type of glass but having its surface modified by cobalt oxide and iron oxide nanoparticles to change the glass color from green to gray or blue.

Samples of Solex® glass were coated according to the following process. The glass pieces were placed in a preheated coating chamber. When the glass temperature reached the desired temperature, the coloring metal oxides were deposited by a flame spray device (Beneq nHALO device) onto and into the surface of the glass. Nanosized metal oxide or elemental particles entered the glass matrix via diffusional flow or ionic exchange. The glass was placed in an annealing furnace (500° C.). The glass was cooled down to room temperature under controlled cooling conditions. Table 1 shows the optical properties modeled for this example.

TABLE 1

|  | Total Iron in glass (%) | Redox | $Co_2O_3$ (PPM) | $FexOy$ (PPM) | Ltc(Y) % | TSET | a* | b* | L* | Glass color |
|---|---|---|---|---|---|---|---|---|---|---|
| Standard | 0.507 | 0.270 | 0 | 0 | 76.67 | 47.81 | −7.51 | 0.65 | 90.29 | Green |
| Sample 1 | 0.507 | 0.270 | 50 | 8 | 46.16 | 35.55 | −0.51 | −0.62 | 73.54 | Neutral gray |
| Sample 2 | 0.507 | 0.270 | 110 | 9 | 33.38 | 30.79 | −0.41 | −10.55 | 64.65 | Blue |

Figure 1:
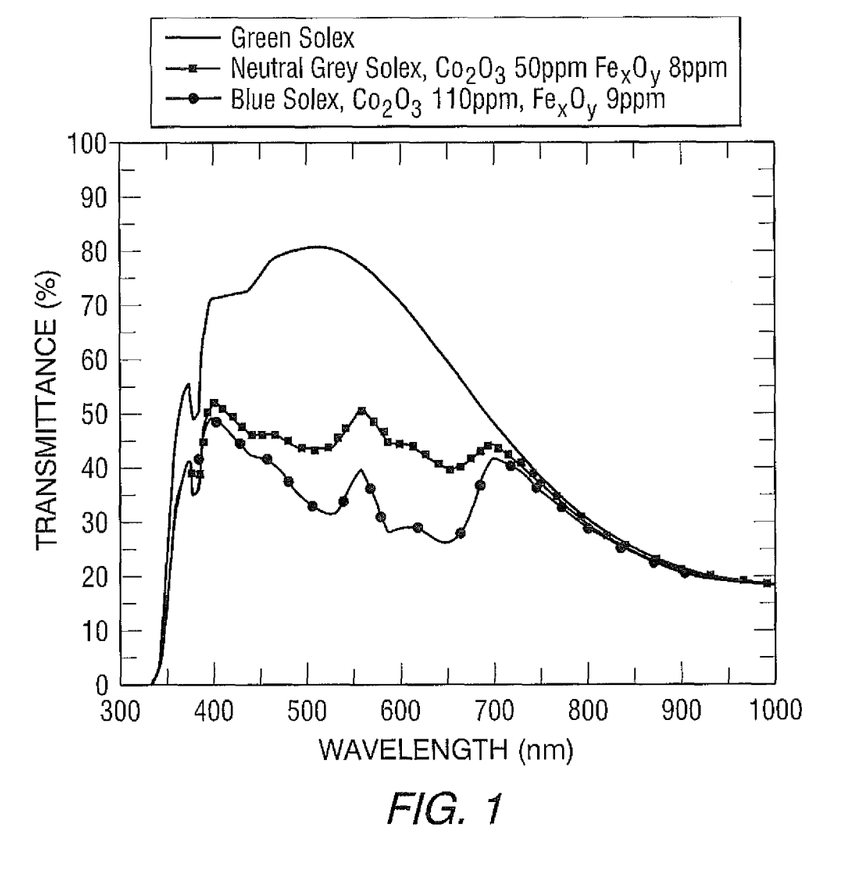
FIG. 1 is a graph of transmittance (%) versus wavelength (nanometers) for Example 1.

The modeled percent transmittance versus wavelength (nm) for the samples is shown in FIG. 1.

Thus, it can be seen that using the same basic glass composition (for example, Solex Glass), the color of the resultant glass sheet can be effectively changed using surface modification by a flame spray apparatus in the float bath.

Example 2

Samples of Solex® glass were coated as described above in Example 1. This Example included two cases:

Case 1: deposited material with Co/Fe precursor ratio 12.2:1. In this case, the mixture was diluted by 1:20 and 1:5. The glass was treated at various temperatures.

Case 2: deposited material with Co/Fe precursor ratio 6.25:1. In this case, the mixture was diluted by 1:20, 1:5, and 1:2.5. The glass was treated at various temperatures.

Results:

X-Ray Diffraction (XRD)

XRD results show that with low concentration (dilution ratio of 1:20), samples prepared at low temperature (550° C.) are amorphous. Crystalline $CO_3O_4$ or CoO appear when increasing deposition temperature. The crystalline peak nearly disappears when temperature reached 750° C.

For high concentration (dilution ratio of 1:5), samples had crystalline $CO_3O_4$ or CoO at a temperature around 600° C. The XRD peaks became sharp and their intensity increased significantly when increasing temperature from 600° C. to 650° C. and to 700° C. The peak intensity then decreased with increasing temperature to 750° C. The XRD peaks nearly disappeared at 800° C. In this case, $Fe_2O_3$ was also found in several samples prepared at 650° C., 700° C., and 750° C.

For the highest concentration samples (Case 2, dilution ratio 1:2.5), the crystalline peaks were detected from samples prepared at 600° C. Both $CO_3O_4$ and CoO crystals were detected from the sample prepared at 700° C. $Fe_2O_3$ phase was also detected from the sample prepared at 750° C. The calculated crystalline size by XRD line broadening was about 17.4 nm for the sample prepared at 700° C., and 14.8 nm for the sample prepared at 750° C.

X-Ray Fluorescence (XRF)

Figure 2:
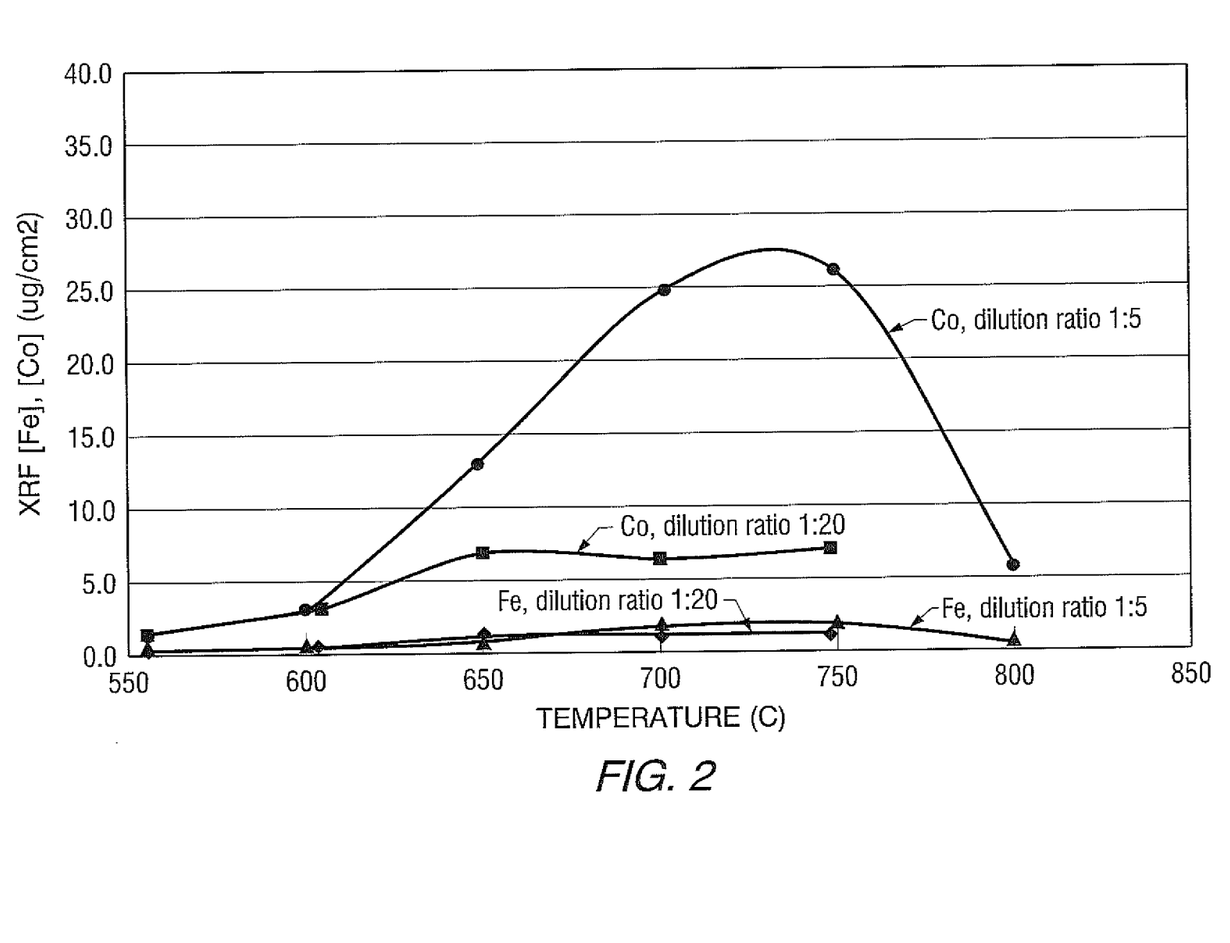
FIG. 2 shows XRF amount of oxides of cobalt [Co] and iron [Fe] incorporated inside the glass surface for case one samples of Example 2 described below (with [Fe] from the base glass excluded)
Figure 3:
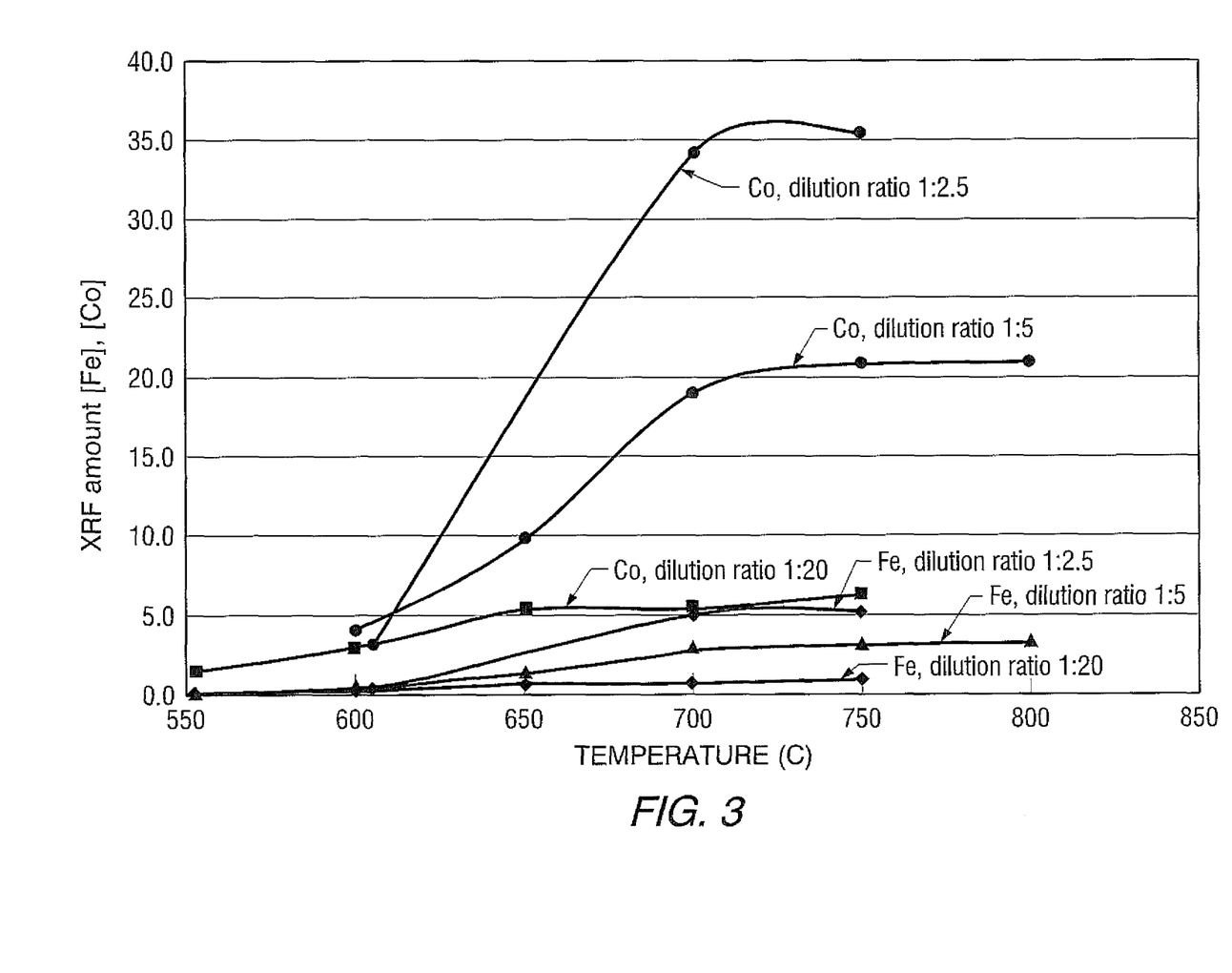
FIG. 3 shows XRF amount of [Co] and [Fe] incorporated inside the glass surface for case two samples of Example 2 described below (with [Fe] from the base glass excluded)

XRF was used to measure the amount of Co and Fe inside the glass surface. The results are shown in FIGS. 2 and 3. XRF results indicated that at 550° C. and 600° C., the incorporation of Co and Fe was very similar regardless of dilution ratio and precursor ratio. With the same dilution ratio, the high precursor Co:Fe ratio gave rise to slightly higher Co and Fe incorporation at temperatures above 600° C. The dilution ratio, however, had a dramatic effect on the incorporation of Co and Fe inside the glass surface. The samples with dilution ratio of 1:5 had higher amount of both Co and Fe inside the glass surface than the sample with dilution ratio of 1:20. The samples with dilution ratio of 1:2.5 had the maximum amount of Co (reaching 36 µg/cm$^2$) and Fe (reaching 5 µg/cm$^2$).

X-Ray Line Scan

X-ray line scan was performed on cross-sectioned samples in order to examine the depth of oxide nanoparticles incorporated inside the glass surface. At 700° C., both Co and Fe could penetrate into the glass surface up to 1.8 um. By contrast, at 800° C., both Co and Fe could penetrate into the glass surface up to 4.22 um.

Haze

Figure 4:
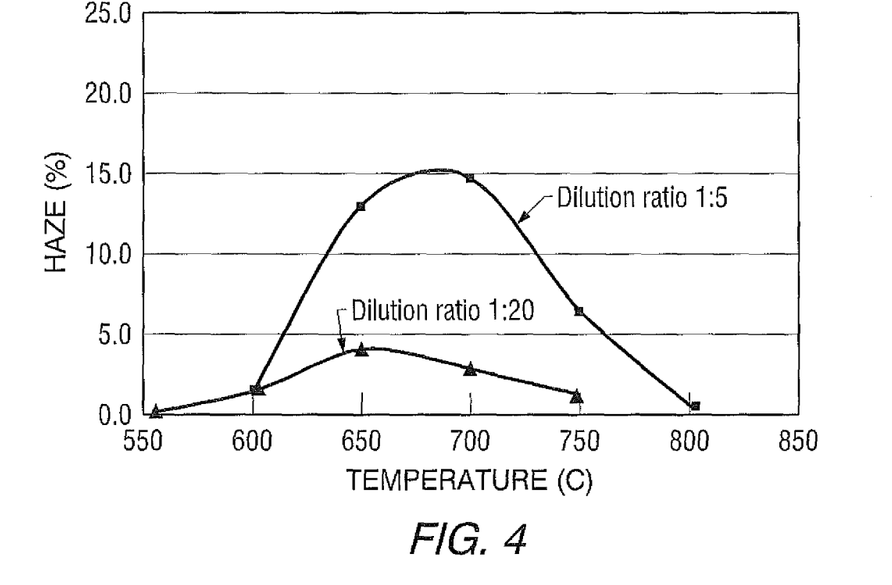
FIG. 4 shows haze from case one samples of Example 2 described below.
Figure 5:
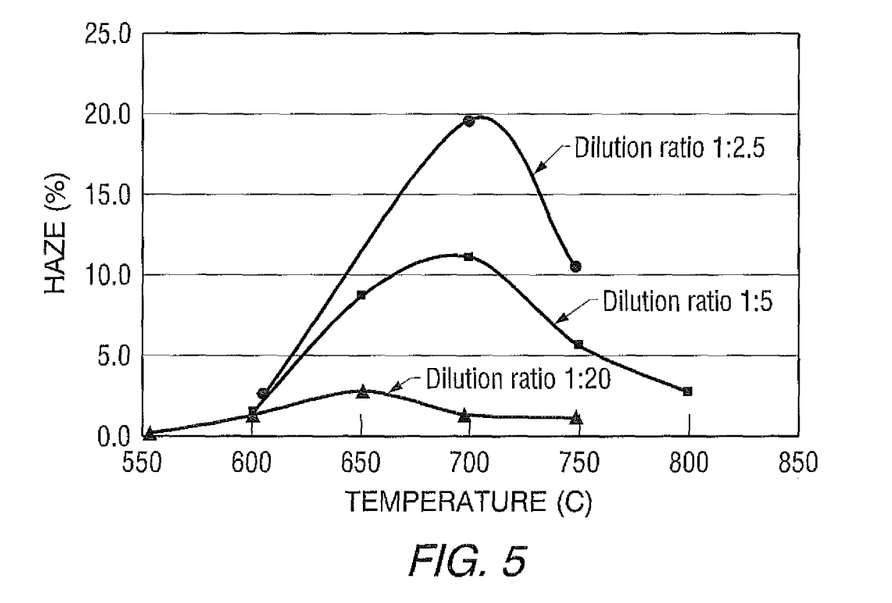
FIG. 5 shows haze from case two samples of Example 2 described below.

Haze was measured to monitor whether the glass sample had light scattering due to the incorporation of oxide nanoparticles. The results are shown in FIGS. 4 and 5. All haze data were measured from samples after polishing the backside of the glass piece. The haze was similar for samples prepared at 550° C. and 600° C., regardless of precursor Co:Fe ratio, and dilution ratio. For samples with 1:20 dilution ratio, haze increased with temperature up to 650° C., and then decreased. For both 1:5 and 1:2.5 dilution ratios, haze increased rapidly, reaching a peak at 700° C. preparation temperature, and then dropped. The maximum haze was seen at around 20% from a case two sample with a dilution ratio of 1:2.5 prepared at 700° C.

Color Change

Figure 6:
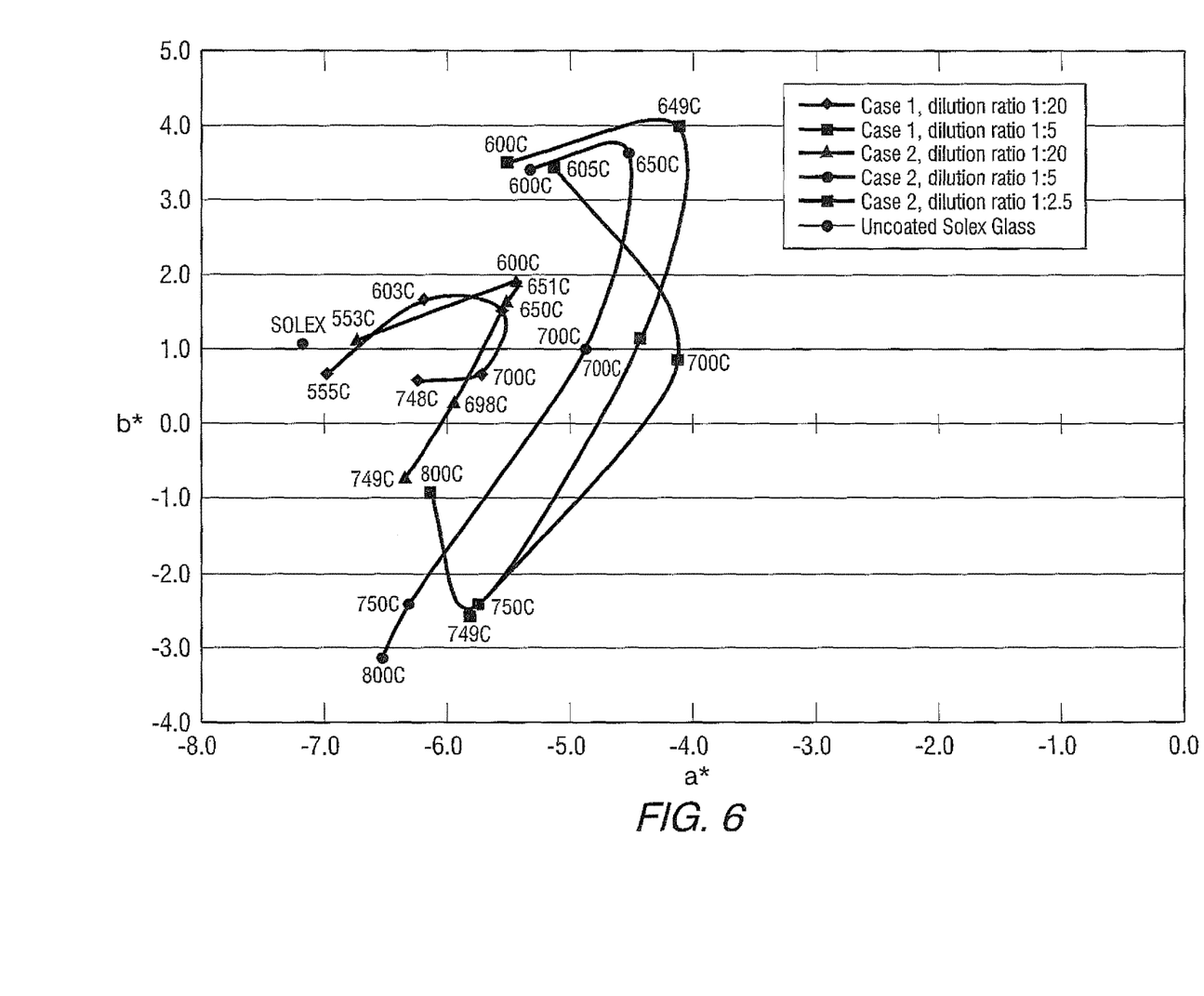
FIG. 6 shows color change of case one and case two samples for Example 2 described below.

FIG. 6 shows the color change of all samples after polishing the backside, as compared to the untreated Solex® glass. It appears that samples with 600° C. and 650° C. treatment move towards positive a* and positive b*. The samples prepared at 700° C. move towards positive a* while keeping b* relatively the same. The samples with 750° C. and 800° C. treatment move towards positive a* and negative b*. This may be a result of forming nanocrystals and/or dissolving of nanocrystals at different temperatures.

Optical Transmittance

Figure 7:
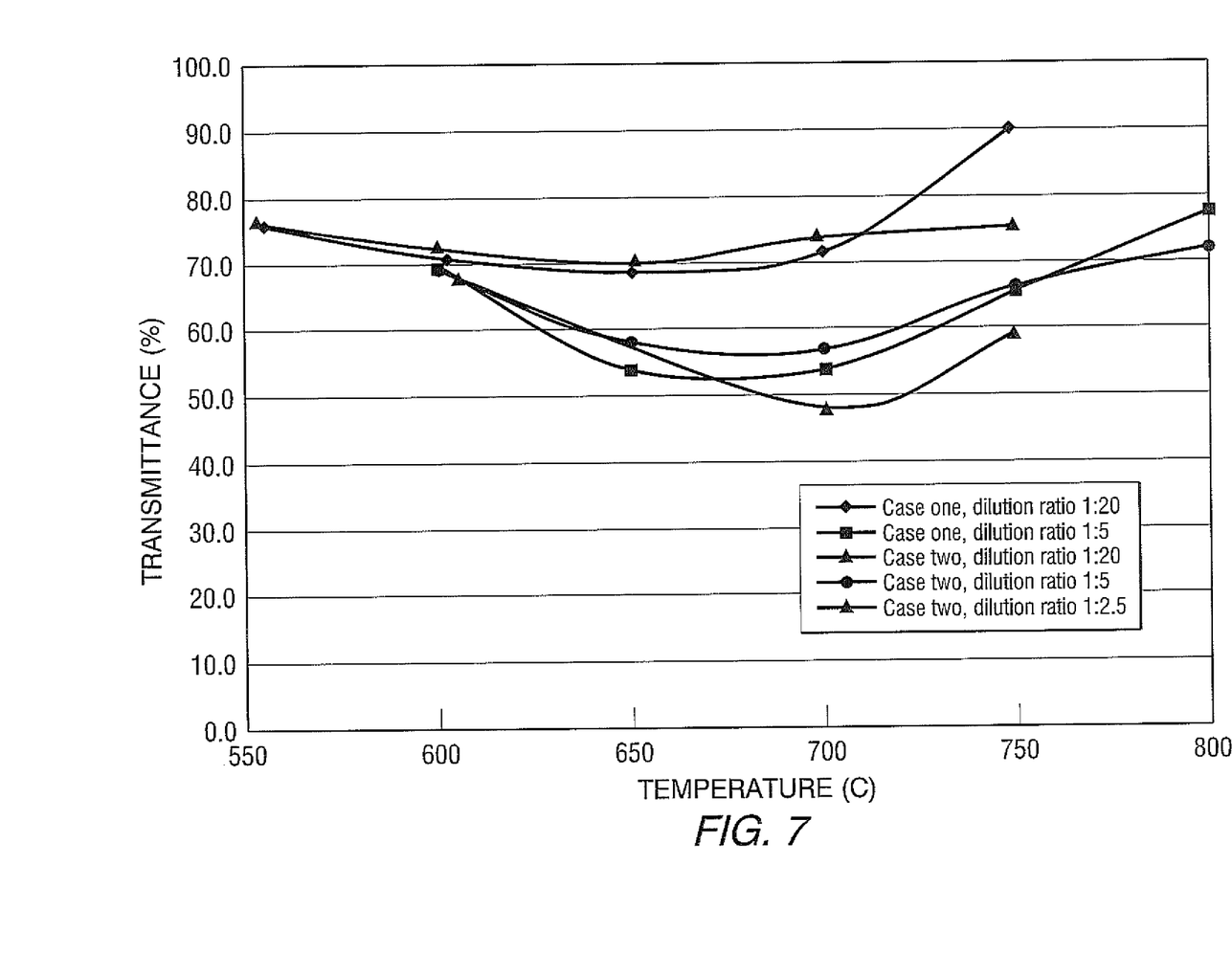
FIG. 7 shows the optical transmittance of case one and case two samples of Example 2 described below.

Optical transmittance was measured on all samples after polishing the backside (FIG. 7). The results show that the optical transmittance decreases with increasing temperature up to about 700° C. (for 1:20 dilution at 650° C.), and then increases with increasing temperature. The optical transmittance changes slightly with precursor Co:Fe ratio. However, the optical transmittance decreases significantly with dilution ratio, from 1:20, to 1:5, to 1:2.5. This change corresponds well with haze, and amount of Co and Fe by XRF for various samples.

Example 3

This example illustrates the combination of iron and manganese nanoparticles (1:1 ratio) on the color of a glass sheet. Samples of Solex® glass were coated as described above in Example 1.

TABLE 2

| Sample | L* | a* | b* | Transmittance and Haze (After Grinding) | |
|---|---|---|---|---|---|
| | | | | T % | H % |
| Fe + Mn, 650° C. | 31.53 | 3.58 | −1.24 | 35.1 | 62.3 |
| Fe + Mn, 700° C. | 32.90 | 3.49 | −1.42 | 53.6 | 36.8 |
| Fe + Mn, 750° C. | 34.35 | 2.91 | −2.59 | 79.2 | 11.2 |

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof.

The invention claimed is:

1. A method of making colored glass in a float glass process, comprising the steps of:
    melting glass batch materials in a furnace to form a glass melt;
    transporting the glass melt into a float glass chamber having a flame spray device, the glass melt forming a float glass ribbon;
    supplying coating materials to the flame spray device to form a spray containing coating particles; and
    directing the spray onto the float glass ribbon to diffuse the coating particles into the surface of the float glass ribbon to form a resultant glass sheet of a desired color, wherein said coating particles comprise metal oxide nanoparticles comprising iron and at least one of cobalt and manganese, and wherein the desired color is neutral gray.

2. The method of claim 1, including varying the coating materials to vary the color of the resultant glass sheet.

3. The method of claim 1, wherein the glass melt has a green hue.

4. The method of claim 1, wherein the glass melt is essentially colorless or clear.

5. The method of claim 1, wherein the glass batch materials include iron and the glass batch materials are essentially free of selenium.

6. The method of claim 1, including directing the spray onto the float glass at a location in the float chamber where the glass ribbon has a temperature in the range of 600° C. to 800° C.

7. The method of claim 6, wherein the desired color is created by mixing colorants of oxide nanoparticles.

\* \* \* \* \*